US008676365B2

(12) United States Patent
Kovesi et al.

(10) Patent No.: US 8,676,365 B2
(45) Date of Patent: Mar. 18, 2014

(54) PRE-ECHO ATTENUATION IN A DIGITAL AUDIO SIGNAL

(75) Inventors: Balazs Kovesi, Lannion (FR); Stéphane Ragot, Lannion (FR)

(73) Assignee: Orange, Paris (FR)

( * ) Notice: Subject to any disclaimer, the term of this patent is extended or adjusted under 35 U.S.C. 154(b) by 287 days.

(21) Appl. No.: 13/063,002

(22) PCT Filed: Sep. 15, 2009

(86) PCT No.: PCT/FR2009/051724
§ 371 (c)(1),
(2), (4) Date: Mar. 9, 2011

(87) PCT Pub. No.: WO2010/031951
PCT Pub. Date: Mar. 25, 2010

(65) Prior Publication Data
US 2011/0178617 A1 Jul. 21, 2011

(30) Foreign Application Priority Data
Sep. 17, 2008 (FR) ..................................... 08 56248

(51) Int. Cl.
*G06F 17/00* (2006.01)

(52) U.S. Cl.
USPC .............................. 700/94; 704/203; 370/503

(58) Field of Classification Search
USPC .............................. 700/94; 704/203; 370/503
See application file for complete search history.

(56) References Cited

U.S. PATENT DOCUMENTS 5,311,549 A * 5/1994 Mahieux ........................ 375/342
2009/0313009 A1* 12/2009 Kovesi et al. ................. 704/203

FOREIGN PATENT DOCUMENTS

FR 2 897 733 A1 8/2007
WO WO 2007096552 A2 * 8/2007 ............. G10L 19/14

* cited by examiner

*Primary Examiner* — Curtis Kuntz
*Assistant Examiner* — Thomas Maung
(74) *Attorney, Agent, or Firm* — Drinker Biddle & Reath LLP

(57) ABSTRACT

A method is provided for attenuating pre-echoes in a digital audio signal generated from a transform encoding, comprising, upon decoding and for a current frame of said digital audio signal: defining a concatenated signal from at least the reconstructed signal of the current frame, dividing said concatenated signal into subunits of samples having a predetermined length, calculating the time envelope of the concatenated signal, detecting the transition of the time envelope towards a high-energy area, determining the low-energy subunits preceding a subunit in which a transition has been detected, and an attenuation step in said determined subunits. The attenuation is carried out according to an attenuation factor calculated for each of the determined subunits, based on the time envelope of the concatenated signal. The invention also relates to a device for implementing said method, and to a decoder including such a device.

11 Claims, 19 Drawing Sheets

$L = 160;\ K_2 = 4;\ N_2 = L / K_2 = 40$ $L = 160;\ K_2 = 4;\ N_2 = L / K_2 = 40$ $L = 160;\ K_2 = 4;\ N_2 = L / K_2 = 40$

PRE-ECHO ATTENUATION IN A DIGITAL AUDIO SIGNAL

CROSS-REFERENCE TO RELATED APPLICATIONS

This application is the U.S. national phase of the International Patent Application No. PCT/FR2009/051724 filed Sep. 15, 2009, which claims the benefit of French Application No. 08 56248 filed Sep. 17, 2008, the entire content of which is incorporated herein by reference.

FIELD OF THE INVENTION

The invention relates to a method and a device for attenuating pre-echoes during the decoding of a digital audio signal.

BACKGROUND

For the transport of digital audio signals over transmission networks, be they for example fixed or mobile networks, or for the storage of signals, use is made of compression processes (or source coding) implementing coding systems of the transform-based frequency coding or temporal coding type.

The method and the device, which are the subject of the invention, thus have as field of application the compression of sound signals, in particular, digital audio signals coded by frequency transform.

FIG. 1 represents by way of illustration, a basic diagram of the coding and of the decoding, of a digital audio signal by transform including an add/overlap analysis-synthesis according to the prior art.

Certain musical sequences, such as percussions and certain speech segments such as plosives (/k/, /t/, . . . ), are characterized by extremely abrupt attacks which result in very fast transitions and a very strong variation in the dynamic swing of the signal in the space of a few samples. An exemplary transition is given in FIG. 1 on the basis of the sample 410.

For the coding/decoding processing, the input signal is sliced into blocks of samples of length L (which are represented here by vertical dashed lines). The input signal is denoted x(n). The slicing into successive blocks leads to defining the blocks $x_N=[x(N.L) \ldots x(N.L+L-1)]=[x_N(0) \ldots x_N(L-1)]$, where N is the index of the frame and L is the length of the frame. In FIG. 1 we have L=160 samples. In the case of the modified cosine modulated transform MDCT (for "Modified Discrete Cosine Transform"), two blocks $x_N(n)$ and $x_{N+1}(n)$ are analyzed jointly to give a block of transformed coefficients associated with the frame of index N.

The division into blocks, also called frames, carried out by the transform coding is totally independent of the sound signal and the transitions therefore appear at any point of the analysis window. Now, after transform decoding, the reconstructed signal is marred by "noise" (or distortion) produced by the quantization (Q)-inverse quantization ($Q^{-1}$) operation. This coding noise is distributed temporally in a relatively uniform manner over the whole of the temporal support of the transformed block, that is to say over the whole of the length of the window of length 2 L of samples (with overlap of L samples). The energy of the coding noise is in general proportional to the energy of the block and is dependent on the decoding rate.

For a block comprising an attack (such as the block 320-340 of FIG. 1) the energy of the signal is high, the noise is therefore also of high level.

In transform coding, the level of the coding noise is below that of the signal for the samples of high energy which immediately follow the transition, but the level is above that of the signal for the samples of lower energy, especially over the part preceding the transition (samples 160-410 of FIG. 1). For the aforementioned part, the signal-to-noise ratio is negative and the resulting degradation can appear very annoying during listening. The coding noise before transition is called pre-echo and the noise after transition is called post-echo.

It may be observed in FIG. 1 that the pre-echo affects the frame preceding the transition as well as the frame where the transition occurs.

Psycho-acoustic experiments have shown that the human ear performs fairly limited temporal pre-masking of sounds, of the order of a few milliseconds. The noise preceding the attack, or pre-echo, is audible when the duration of the pre-echo is greater than the duration of the pre-masking.

The human ear also performs post-masking of a longer duration, from 5 to 60 milliseconds, when switching from high-energy sequences to low-energy sequences. The acceptable degree or level of annoyance for the post-echoes is therefore greater than for the pre-echoes.

The more critical phenomenon of pre-echoes is all the more annoying the greater the length of the blocks in terms of number of samples. Now, in transform coding, it is necessary to have a faithful resolution of the most significant frequency zones. At fixed sampling frequency and at fixed rate, if the number of points of the window is increased, more bits will be available for coding the frequency spectral lines deemed useful by the psycho acoustic model, hence the advantage of using blocks of large length. The MPEG AAC coding (Advanced Audio Coding), for example, uses a window of large length which contains a fixed number of samples, 2048, i.e. over a duration of 64 ms at a sampling frequency of 32 kHz. The transform coders used for conversational applications often use a window of duration 40 ms at 16 kHz and a frame renewal duration of 20 ms.

SUMMARY

With the aim of reducing the aforementioned annoying effect of the phenomenon of pre-echoes various solutions have been proposed hitherto.

A first solution consists in applying adaptive filtering. In the zone preceding the transmission due to the attack, the reconstituted signal consists in fact of the original signal and of the quantization noise superimposed on the signal.

A corresponding filtering technique has been described in the article entitled High Quality Audio Transform Coding at 64 kbits, IEEE Trans. On Communications Vol 42, No. 11, November 1994, published by Y. Mahieux and J. P. Petit.

The implementation of such filtering requires the knowledge of parameters some of which are estimated at the decoder on the basis of the noisy samples. On the other hand, information such as the energy of the original signal may be known only at the coder and must consequently be transmitted. When the block received contains an abrupt variation in dynamic swing, the filtering processing is applied to it.

The aforementioned filtering process does not make it possible to retrieve the original signal, but affords a large reduction in the pre-echoes. However, it requires the additional auxiliary parameters to be transmitted to the decoder.

A technique which does not require the transmission of auxiliary parameters is described in French patent application FR 06 01466. The scheme described makes it possible to discriminate the presence of pre-echoes and to attenuate the pre-echoes of a digital audio signal produced by hierarchical coding (generating a multilayer binary train) on the basis of a transform coding, generating pre-echo, and of a temporal coding, not generating any pre-echoes.

This patent application describes more precisely the detection at the decoder of a zone of low energy preceding a transition to a zone of high energy, the attenuation of the pre-echoes in the detected zones of low energy and the inhibiting of the attenuation of the pre-echoes in the zone of high energy. The processing making it possible to attenuate the pre-echoes is based on a comparison between the signal arising from a transform decoding (generating pre-echoes) and a signal arising from a temporal decoding (not generating echoes).

This technique does not require any transmission of specific auxiliary information coming from the coder but requires the presence of a reference signal arising from a temporal decoding.

A reference signal arising from a temporal decoding is not necessarily available to all the decoders using a transform decoding. Moreover, in the case where such a reference signal is available to the decoder, it is not always suitable for calculating the attenuation of the pre-echoes.

A stereo scalable coder, for example the stereo extension of the norm UIT-T G.729.1, can operate in the manner described hereinafter.

The coder calculates the mean of the two channels, left and right, of the stereo signal, and then codes this mean with the G.729.1 coder, and finally transmits additional stereo extension parameters. The binary train transmitted to the decoder therefore comprises a G.729.1 layer with additional stereo extension layers. For example, a first additional layer comprises parameters reflecting the difference in energy per subband (in the transformed domain) between the two channels of the stereo signal. A second layer comprises for example the transformed coefficients of the residual signal, which is defined as the difference between the original signal and the signal decoded on the basis of the G.729.1 binary train and of the first layer.

The G.729.1 decoder in extended mode, firstly decodes the mono signal and retrieves as a function of the transmitted parameters, the transformed coefficients of both channels, left and right.

The decoding of the mono signal by a decoder of G.729.1 type yields a reference signal based on the mean of the two channels. In the case where the difference of levels between the two channels is large, the temporal envelope of the mono signal will then be low with respect to the output of the inverse transform of the channel of larger level and high with respect to the output of the inverse transform of the channel of lower level.

The use of a reference such as the output of the G.729.1 decoder to attenuate the pre-echoes will not therefore be effective for stereo decoding: in the channel of larger level, too much pre-echo will wrongly be detected and useful signal will therefore be removed, while in the channel of lower level, not all the pre-echoes will either be detected or removed.

A requirement therefore exists for a technique for accurately attenuating pre-echoes upon decoding, in the case where a signal arising from a temporal decoding is not available or is not efficacious and where no auxiliary information is transmitted by the coder. This technique must, moreover, be able to operate for mono and stereo coding.

For this purpose, the present invention concerns a method for attenuating pre-echoes in a digital audio signal produced on the basis of a transform coding, in which, upon decoding, for a current frame of this digital audio signal, the method comprises:

- a step of defining a concatenated signal, on the basis at least of the reconstructed signal of the current frame;
- a step of dividing said concatenated signal into sub-blocks of samples of determined length;
- a step of calculating a temporal envelope of the concatenated signal;
- a step of detecting a transition of the temporal envelope to a high-energy zone;
- a step of determining the sub-blocks of low energy preceding a sub-block in which a transition has been detected; and
- a step of attenuation in the determined sub-blocks, the method being characterized in that the attenuation is performed according to an attenuation factor calculated for each of the determined sub-blocks, as a function of the temporal envelope of the concatenated signal.

Thus, the attenuation factor is defined on characteristics specific to the decoded signal which do not require any transmission of information from the coder nor any signal arising from a decoding that does not generate echoes.

A factor suited to each sub-block of the current frame and calculated on the basis of the reconstructed signal makes it possible to improve the quality of the pre-echoes attenuation processing.

The concatenated signal may be defined on the basis of the reconstructed signal of the current frame and of the second part of the current frame, such as defined subsequently with reference to FIG. 2. In this case, the scheme does not introduce any temporal delay.

In the case where a temporal delay is permitted, the concatenated signal is defined as the reconstructed signal of the current frame and of the following frame.

The concatenated signal may be physically stored in various places as sub-blocks.

The various particular embodiments mentioned hereinafter may be added independently or in combination with one another, to the steps of the above-defined method.

Thus, in a particular embodiment, a minimum value is fixed for an attenuation value of the factor as a function of the temporal envelope of the reconstructed signal of the previous frame.

This makes it possible to avoid too large a difference of attenuation from one frame to another in particular on the background noise level and thus to avoid audible artifacts.

The temporal envelope of the reconstructed signal of the previous frame can for example be determined by calculation of the minimum energy per sub-block or else by calculation of the mean energy or any other calculation.

In a particular embodiment of the invention, the attenuation factor is determined as a function of the temporal envelope of said sub-block, of the maximum of the temporal envelope of the sub-block comprising said transition and of the temporal envelope of the reconstructed signal of the previous frame.

In an exemplary embodiment, the temporal envelope is determined by a sub-block energy calculation.

Advantageously, the method furthermore comprises a step of calculating and storing the temporal envelope of the current frame after the step of attenuation in the determined sub-blocks.

This temporal envelope calculation will therefore be used to process the following frame. This calculation is accurate since the signal is no longer disturbed by the pre-echoes.

Advantageously, an attenuation factor of value 1 is allocated to the samples of said sub-block comprising the transition as well as to the samples of the following sub-blocks in the current frame.

The attenuation is therefore inhibited in these sub-blocks which do not comprise any pre-echoes.

In a particular embodiment, the attenuation factor is determined per sub-block determined according to the following steps:

- calculation of the ratio of the maximum energy determined in the sub-block comprising a transition over the energy of the current sub-block;
- comparison of the ratio with a first threshold;
- in the case where the ratio is less than or equal to the first threshold, allocating of a value inhibiting the attenuation to the attenuation factor;
- in the case where the ratio is greater than the first threshold:
  - comparison of the ratio with a second threshold;
  - in the case where the ratio is less than or equal to the second threshold, allocating of a low attenuation value to the attenuation factor;
  - in the case where the ratio is greater than the second threshold, allocating of a high attenuation value to the attenuation factor.

This particular embodiment has turned out to be particularly effective and is simple to implement.

Advantageously, the method provides for the determination of a smoothing function between the factors calculated sample by sample.

This also makes it possible to avoid audible artifacts during too abrupt a variation of the attenuation values.

In an implementation variant, a factor correction is performed for the sub-block preceding the sub-block comprising a transition, by applying an attenuation value inhibiting the attenuation, to the attenuation factor applied to a predetermined number of samples of the sub-block preceding the sub-block comprising a transition.

This therefore makes it possible not to decrease the amplitude of the attack by the smoothing function defined for the attenuation values.

The present invention is also aimed at a device for attenuating pre-echoes in a digital audio signal produced on the basis of a transform coder, in which, the device associated with a decoder comprises, for processing a current frame of this digital audio signal:

- a module for defining a concatenated signal, on the basis at least of the reconstructed signal of the current frame;
- a module for dividing said concatenated signal into sub-blocks of samples of determined length;
- a module for calculating a temporal envelope of the concatenated signal;
- a module for detecting a transition of the temporal envelope to a high-energy zone;
- a module for determining the sub-blocks of low energy preceding a sub-block in which a transition has been detected; and
- a module for attenuation in the determined sub-blocks.

The device is such that the attenuation module performs the attenuation according to an attenuation factor calculated for each of the determined sub-blocks, as a function of the temporal envelope of the concatenated signal.

The invention is aimed at a decoder of a digital audio signal comprising a device such as described above.

Such a decoder can for example be a decoder of G.729.1-SWB/stereo type studied in question 23 of the UIT-T, commission 16.

The invention may be integrated into such a decoder in stereo mode or in SWB ("Super Wide Band") mode.

Finally, the invention is aimed at a computer program comprising code instructions for the implementation of the steps of the attenuation method such as described, when these instructions are executed by a processor.

BRIEF DESCRIPTION OF THE DRAWINGS

Other characteristics and advantages of the invention will be more clearly apparent on reading the following description, given solely by way of nonlimiting example and with reference to the appended drawings in which.

DETAILED DESCRIPTION

Figure 1:
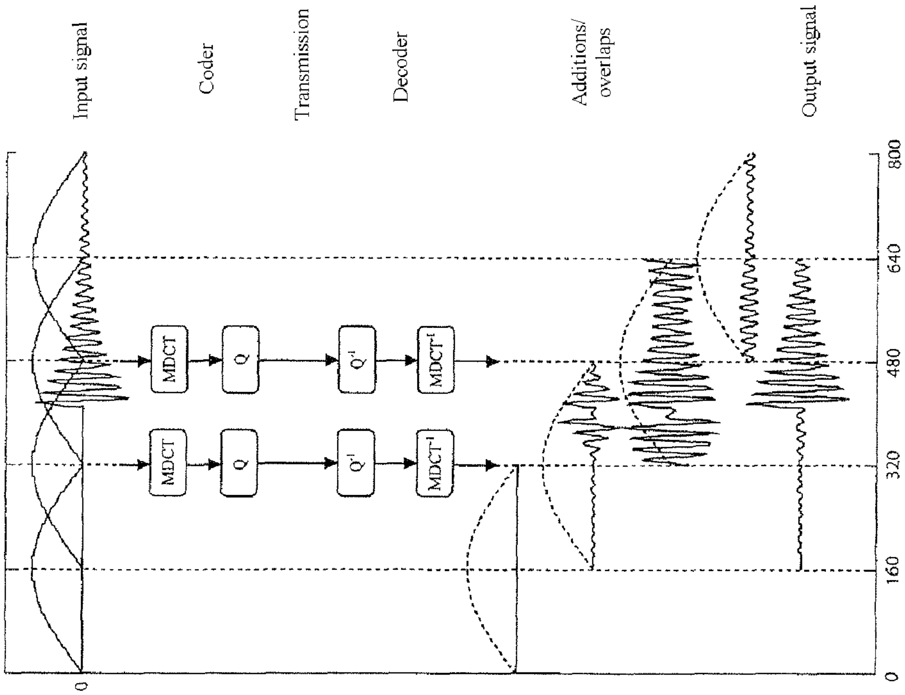
Figure 1 (PRIOR ART)
FIG. 1 described previously illustrates a transform coding-decoding system according to the state of the art.
Figure 2:
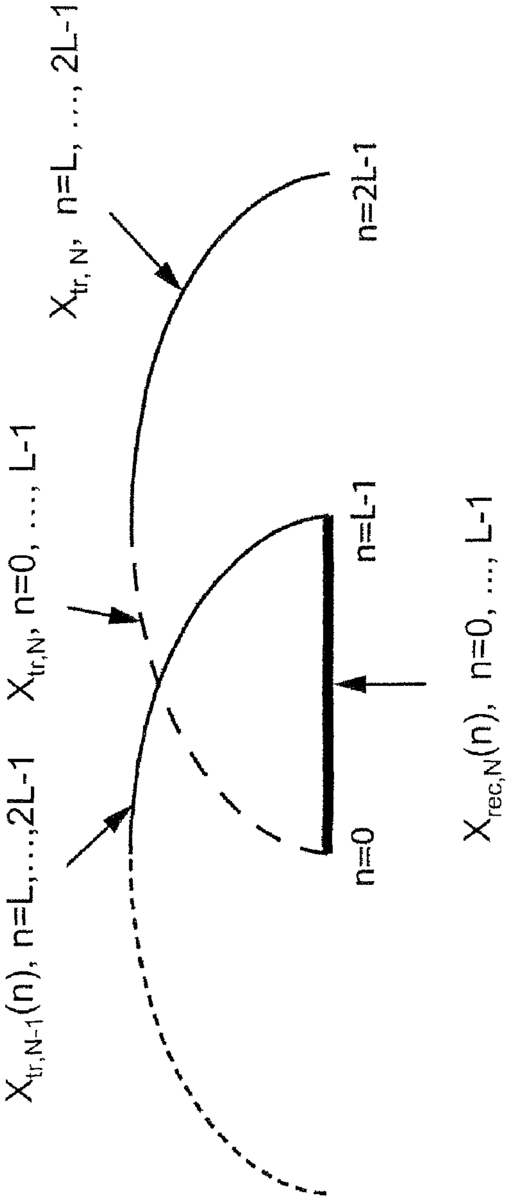
FIG. 2 illustrates the configuration of the reconstructed signal with respect to the current frame of a signal.

FIG. 2 represents a frame of the decoded signal as well as the configuration of the signal reconstructed by addition overlap such as described with reference to FIG. 1. Hereinafter, the following notation is used with reference to FIG. 2 and to the following equation:

$$x_{rec,N}(n)=h(n+L)x_{tr,N-1}(n+L)h(n)x_{tr,N}(n) \text{ for } n\in[0,L-1]$$

where N is the index of the frame, L is the length of the frame, $x_{rec,N}$ is the reconstructed signal of the frame N, $x_{tr,N}$ is the signal of length 2 L arising from the MDCT inverse transformation of frame N. Without entering into the details of the MDCT and of the MDCT inverse transformation, the intermediate signal $x_{tr,N}$ of length 2 L for frame N is defined as:

$$x_{tr,N} = \left[ \underbrace{y_r(0) \ldots y_r\left(\frac{L}{2}-1\right)}_{y_r} \; \underbrace{-y_r\left(\frac{L}{2}-1\right) \ldots -y_r(0)}_{-y_r\ inverted} \; \underbrace{y_i(0) \ldots y_i\left(\frac{L}{2}-1\right)}_{y_i} \; \underbrace{y_i\left(\frac{L}{2}-1\right) \ldots y_i(0)}_{y_i\ inverted} \right]$$

where $y_r(n)$ and $y_i(n)$ are intermediate signals which are not detailed here. It may then be shown that the reconstructed signal $x_{rec,N}$ of frame N is given by:

$$x_{rec,N}(n)=h(n+L)x_{tr,N-1}(n+L)+h(n)x_{tr,N}(n) \text{ for } n\in[0,L-1]$$

The reconstruction is therefore performed by addition-overlap.

It is noted that the intermediate signal comprises an anti-symmetric part and a symmetric part. During the decoding of frame N, the binary train which makes it possible to find $x_{tr,N}$ is received; it is therefore possible to reconstruct $x_{rec,N}(n)$, n=0 . . . L−1. On the other hand, only "half" the information is available on the future frame of index N+1, that is to say $x_{tr,N}$, n=L . . . 2 L−1, on the future frame of index N+1. It is important to note that for all the variant embodiments of MDCT (and of its inverse) it is always possible to define an intermediate signal $x_{tr,N}$ of the form defined hereinabove. However in certain realizations the signal $x_{tr,N}$ is not explicit as such, only the intermediate signals $y_r(n)$ and $y_i(n)$, comprising "temporal aliasing", are available.

Thus, in a transform decoder, the reconstructed signal of the current frame ($x_{rec,N}(n)$, n=0 to L−1) is obtained by weighted addition of the second part of the output of the inverse transform of the MDCT coefficients of the previous frame ($x_{tr,N-1}(n)$, n=L to 2 L−1) and of the first part of the output of the inverse transform of the MDCT coefficients of the current frame ($x_{tr,N}(n)$, n=0 to L−1). The second part of the output of the inverse transform of the MDCT coefficients of the current frame ($x_{tr,N}(n)$, n=L to 2 L−1) will be retained in memory and will become $x_{tr,N-1}(n)$, n=L to 2 L−1 so as to be utilized to obtain the reconstructed signal of the following frame. For simplicity, hereinafter, the terms "first part of the current frame", "second part of the current frame", "reconstructed signal of the current frame" will be used. In the following frame, the second part of the current frame therefore becomes the second part of the previous frame.

To further simplify the figures, the following notation is also introduced for the second part of the current frame scaled up, that is to say multiplied by the maximum value of the MDCT transform synthesis window:

$$x_{cur2h,N}(n)=h(L)\cdot x_{tr,N}(L+n),\ n=0 \text{ to } L-1$$

In particular, for an attack situated in the current frame, in the first or second part, the method for attenuating the pre-echoes according to an embodiment of the invention generates a concatenated signal [$x_{rec,N}(0) \ldots x_{rec,N}(L-1)\ x_{rec,N}(L-1)\ x_{cur2h,N}(0) \ldots x_{cur2h,N}(L-1)$], on the basis of the reconstructed signal of the current frame $x_{rec,N}(n)$ and of the signal of the second part of the current frame scaled up $x_{cur2h,N}(n)$.

This concatenated signal is divided into sub-blocks of samples of determined length, here an even number.

The method determines the sub-blocks of the current block requiring attenuation of pre-echoes.

The attenuation method also comprises a step of calculating the attenuation factor to be applied to the determined sub-blocks. The calculation is performed for each of the sub-blocks as a function of the temporal envelope of the concatenated signal.

This calculation can also be performed as a function furthermore of the temporal envelope of the reconstructed signal of the previous frame.

Figure 3:
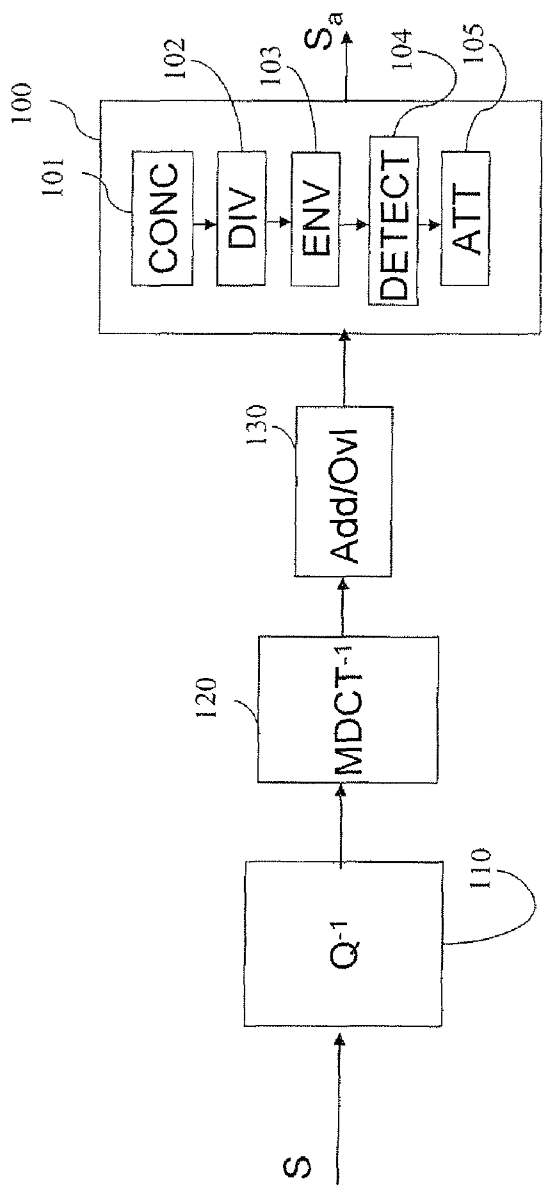
FIG. 3 illustrates a device for attenuating pre-echoes in a digital audio signal decoder.

Thus with reference to FIG. 3, an attenuation device 100 comprises a module 101 for defining a concatenated signal, a module 102 for dividing the concatenated signal into sub-blocks, a module 103 for calculating a temporal envelope of the concatenated signal, a module 104 for detection a transition of the temporal envelope to a high-energy zone and for determining the sub-blocks of low energy preceding a sub-block in which a transition has been detected and a module 105 for attenuation in the determined sub-blocks. The attenuation module is able to apply an attenuation factor to the sub-blocks determined by the module 104, the attenuation factor being determined by the attenuation module as a function of the temporal envelope of the concatenated signal.

With reference to FIG. 3, the attenuation device is included in a decoder comprising a module 110 for inverse quantization ($Q^{-1}$), a module 120 for inverse transform ($MDCT^{-1}$), a module 130 for reconstructing the signal by add/overlap (add/ovl) as described with reference to FIG. 1 and delivering a reconstructed signal to the attenuation device according to the invention.

Figure 4A:
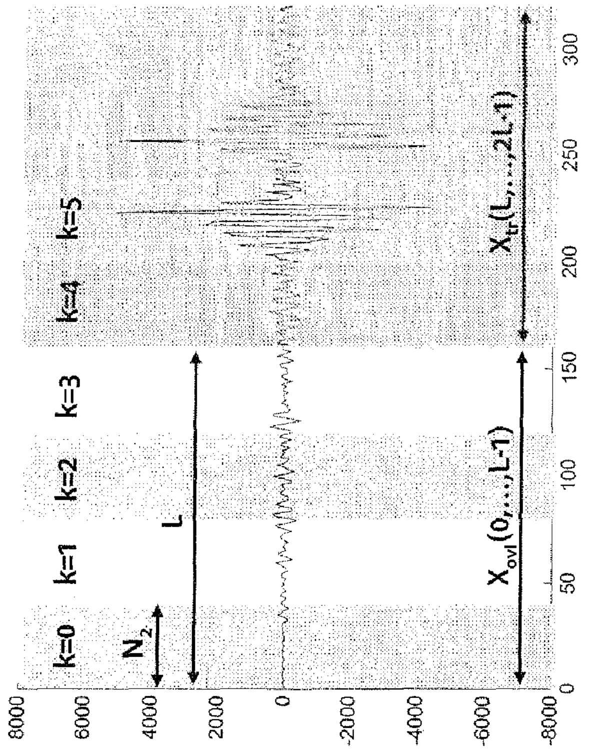
FIG. 4*a* represents the concatenated signal when a transition lies in the second part of the current frame.
Figure 4B:
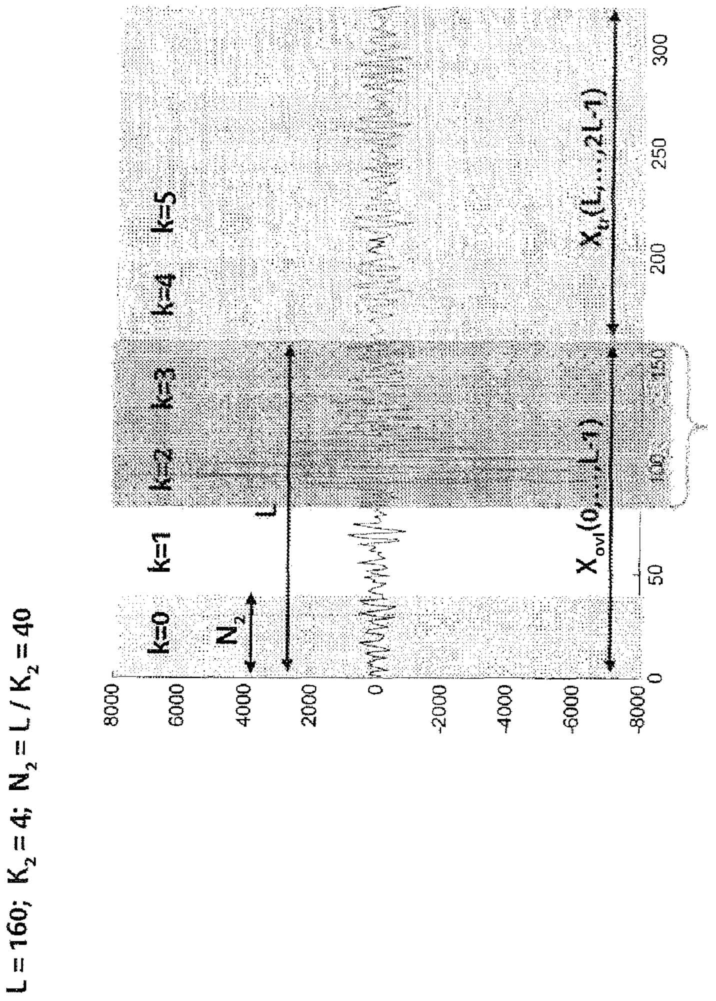
FIG. 4*b* represents the concatenated signal when a transition lies in the reconstructed signal of the current frame.

FIGS. 4*a* and 4*b* illustrate examples of signals comprising transitions or attacks in the signal. The pre-echo phenomenon exists when the energy of a part of the signal in an MDCT window is markedly greater (attack) than that of the other parts. The pre-echo is then observed in the low-energy parts before the attack. It is therefore in this part that it is necessary to attenuate the pre-echoes.

Two cases are possible: the attack or the transition of the signal lies in the current frame (first L samples) or in the following frame (following L samples) corresponding to the second part of the current frame, as represented in FIG. 2.

FIG. 4*a* represents a signal concatenated with an attack of the signal in the second part of the current frame. It is possible to see in this figure the slicing into $K_2$ sub-blocks k of length $N_2$ samples with $N_2=L/K_2$, $K_2=4$. The first L samples represent the reconstructed signal of the current frame $x_{rec,N}(n)$, n=0, . . . , L−1. The following L samples (L to 2 L−1) represent the second part of the current frame $x_{cur2h,N}(n)$, n=0, . . . , L−1. In the following frame, this second part becomes the first part of the previous frame.

Note that the second part of the current frame is symmetric by property of the MDCT inverse transform. Indeed according to the invention the pre-echoes are attenuated without introducing additional delay into the transform decoding. During the decoding of the current frame, the decoder synthesizes the samples $x_{tr,N}(n)$, n=0, . . . , 2L−1, but can only use the samples $x_{tr,N}(n)$, n=0, . . . , L−1 to reconstruct $x_{rec,N}(n)$, n=0, . . . , L−1.

It is seen that the attack or transition lies in the following frame (but without being able to give its position further), it is therefore necessary to attenuate the pre-echo for the first L samples of the current frame of the reconstructed signal.

FIG. 4*b* represents the same signal a frame later, this time the attack lies in the current frame of the reconstructed signal, in the third sub-block (k=2). It is therefore necessary to attenuate the pre-echo in the first two sub-blocks.

The method for attenuating the pre-echoes according to the invention delivers pre-echo attenuation factors for each sample of the frame. This method will now be described with reference to FIGS. 5 and 6.

Figure 5:
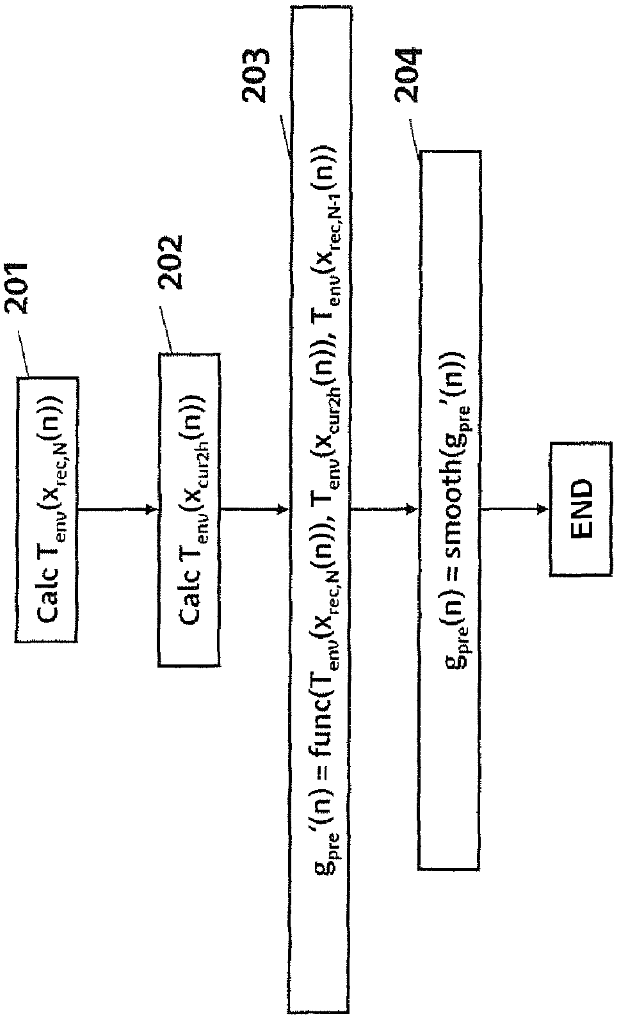
FIG. 5 illustrates a flowchart representing a general embodiment of the steps of the calculation of the attenuation factor according to the invention.

The flowchart represented in FIG. 5 illustrates the various steps of calculating the attenuation factor according to the invention for a current frame.

In step 201, the temporal envelope of the reconstructed signal of the current frame is calculated and in step 202, the temporal envelope of the second part of the current frame scaled up is calculated.

The temporal envelope is for example obtained by calculating the energy based on sub-blocks as described with reference to FIG. 6. It may be obtained by other schemes, by calculating for example the mean of the absolute values of the signal based on sub-blocks, or else the maximum value or the median value of each sub-block. The envelope can also be obtained for example as an operator of Teager-Kaiser type followed by a low-pass filtering. In all cases it is assumed here, without loss of generality, that the temporal envelope is defined with a temporal resolution of a value per sub-block, the size of the sub-blocks being flexible.

In step 203, an attenuation factor function is defined on the basis of the envelopes of the current frame defined in steps 201 and 202 and on the basis of the envelope of the reconstructed signal of the previous frame ($T_{env}(x_{rec,N-1}(n))$).

Step 204, optional, defines a smoothing function on the values obtained for the attenuation factor so as to avoid the discontinuities which might be revealed in the processed signal.

Figure 6:
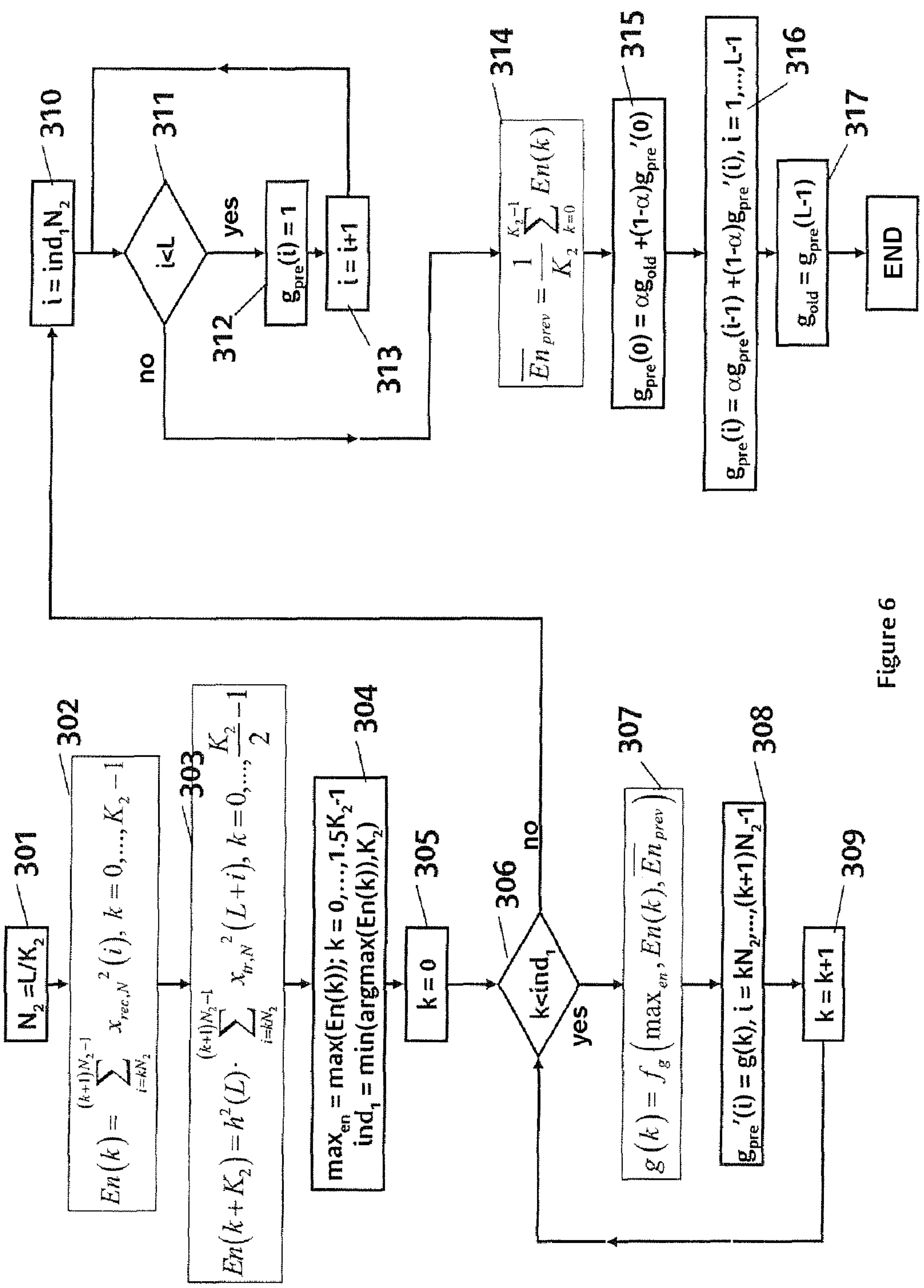
FIG. 6 illustrates a detailed flowchart of the implementation of the attenuation method according to an embodiment of the invention.

With reference to FIG. 6, the attenuation method in an embodiment which is detailed of the invention will now be described.

Thus, in step 301, as illustrated in FIG. 4*a* or 4*b*, the signal is sliced into sub-blocks of length $N_2=L/K_2$. We thus obtain 2 $K_2$ sub-blocks.

In step 302, the energy En(k) of the $K_2$ sub-blocks of the reconstructed signal $x_{rec,N}(n)$ is calculated.

In step 303, the energy of each sub-block of the second part of the current frame scaled up $x_{cur2h,N}(n)$, is calculated. Only $K_2/2$ values are different on account of the symmetry of this part of the signal as represented in FIG. 4*a*.

The maximum of the energies of the signal sub-blocks $x_{rec,N}(n)$ and $x_{cur2h}(n)$ is calculated in step 304 over the $K_2+K_2/2=3$ $K_2/2$ blocks and its index is stored in $ind_1$.

The value of the maximum energy $max_{en}$ thus calculated is also stored.

In step 305 a loop counter is initialized. In the loop of steps 306 to 309, an attenuation factor g(k) is determined at 307, for each sub-block preceding the sub-block of index ind1, as a function of its energy En(k), of the maximum energy $max_{en}$ and of the mean energy of the reconstructed signal of the previous frame $x_{rec,N-1}$ and this factor is allocated to all the samples of the sub-block at 308.

In step 310, the index of the first sample of the sub-block at the maximum energy is calculated. In step 311, a check is carried out to verify whether it is less than the length of the frame. If so, the sub-block of maximum energy is in the current frame and the factor 1, that is to say a value inhibiting the attenuation, is allocated to all the samples from the start of the sub-block up to the end of the frame in the loop of steps 311-312-313.

In step 314 the mean energy of the reconstructed current frame, that is to say of the first $K_2$ blocks of the reconstructed signal $x_{rec,N}(n)$, is calculated and stored. It will be used in the following frame for the calculation of the new factors. In a variant, the equation of this step can be replaced with another which takes account also of the attenuation of the pre-echoes, for example through the following equation:

$$\overline{En}_{prev} = \frac{1}{K_2}\sum_{k=0}^{K_2-1} En(k)\cdot g^2(k)$$

Thus, the processed signal which is no longer disturbed by pre-echoes is taken into account.

In steps 315 and 316, a function for smoothing the factors is determined and applied sample by sample so as to avoid overly abrupt variations of the factor.

This smoothing function is for example defined by the following equations:

$$g_{pre}(0)=\alpha g_{old}+(1-\alpha)g_{pre}'(0)$$

$$g_{pre}(i)=\alpha g_{pre}(i-1)+(1-\alpha)g_{pre}'(i),\ i=1, \ldots, L-1$$

where the factor defined for the previous sample and the factor of the current sample are weighted to obtain the smoothed factor.

The last attenuation factor obtained for the last sub-block to be attenuated of the current frame is stored for use in the following frame in step 315.

Other smoothing functions are possible such as for example a linear transition between the two values of factor, either with a constant slope (for example in increments of 0.05), or with a fixed length (for example over 16 samples).

Once the factors have been thus calculated, the pre-echo attenuation is done on the reconstructed signal of the current frame by multiplying each sample by the corresponding factor:

$$x_{recg,N}(n)=g(n)x_{rec,N}(n),\ n=0 \text{ to } L-1$$

Figure 7:
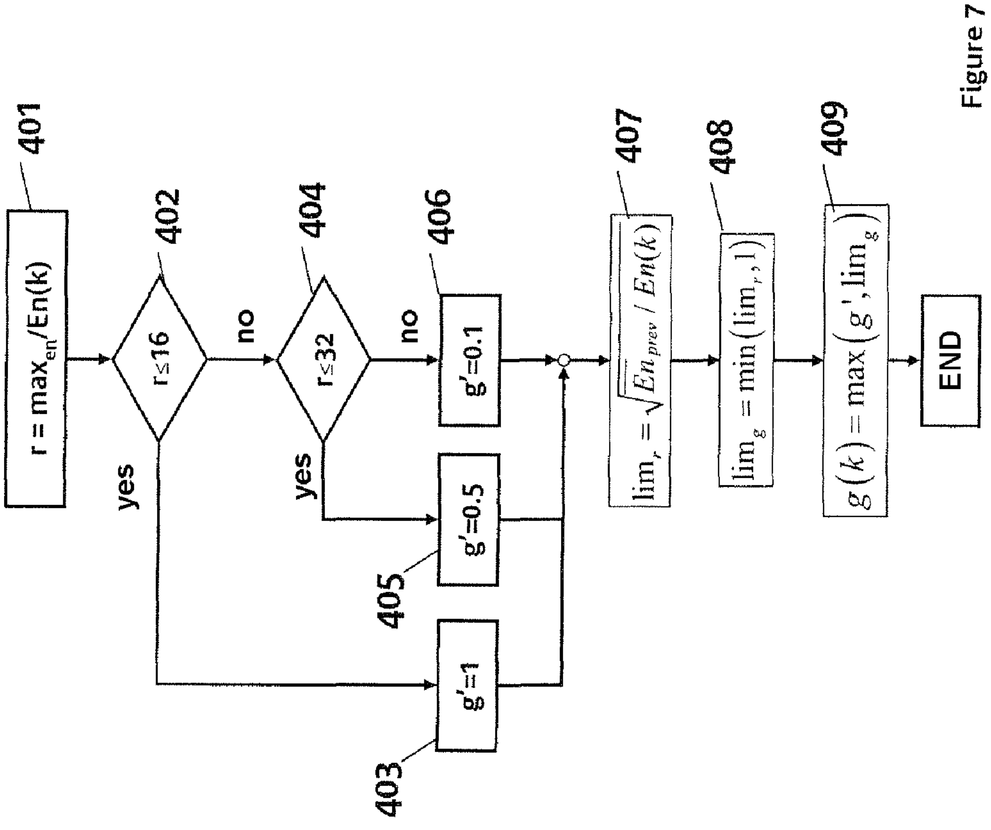
FIG. 7 illustrates a particular embodiment of the calculation of the attenuation factor according to the invention.

Step 307 of calculating the attenuation factor for a sub-block is now detailed in a particular embodiment of the invention with reference to FIG. 7.

In this embodiment, the ratio $max_{en}$/En(k) of the maximum energy determined in step 304 to the energy of the processed sub-block is firstly calculated in step 401.

In practice, this ratio may be inverted and the thresholds adapted accordingly.

Step 402 tests whether this ratio is less than or equal to a first threshold 51. The value of 51 is fixed at 16 in the example, this value being optimized experimentally.

If it is, the variation of the energy with respect to the maximum energy is low so as to produce an annoying pre-echo, no attenuation is then necessary. The factor is then fixed in step 403, at an attenuation value inhibiting the attenuation, that is to say 1.

Otherwise, step 404 tests whether the ratio r is less than or equal to a second threshold S2. The value of S2 is fixed at 32 in the example, this value being optimized experimentally.

If it is, this means that it is possible to have a small annoying pre-echo which has to be attenuated slightly by fixing the factor in step 405, at a low attenuation value, for example at 0.5. When the ratio is greater than this second threshold, the risk of pre-echo is then a maximum and in step 406 a high attenuation value is applied to the factor, for example 0.1.

In most cases, especially when the pre-echo is annoying, the frame which precedes the pre-echo frame has a homogeneous energy which corresponds to the energy of the background noise at this moment. According to experience it is neither useful nor even desirable that the energy of the signal becomes less than the mean energy of the previous frame after the pre-echo processing.

In step 407 a limit value of the factor Um, is therefore calculated, with which exactly the same energy as the mean energy of the previous frame is obtained for the given sub-block. Next in step 408, this value is limited to a maximum of 1 since here the attenuation values are of interest.

The value $lim_g$ thus obtained serves as lower limit in the final calculation of the attenuation factor in step 409.

In a variant embodiment of the calculation of the attenuation factor, a rate characteristic of the signal transmitted may be taken into account. Indeed, in a low-rate transmission, the quantization noise is in general considerable, thereby increasing the risk of annoying pre-echo. Conversely, at very high rate, the coding quality may be very good and no pre-echo attenuation is then necessary.

In the case of multi-rate coding/decoding, the rate information can therefore be taken into account to determine the attenuation factor.

Figure 8A:
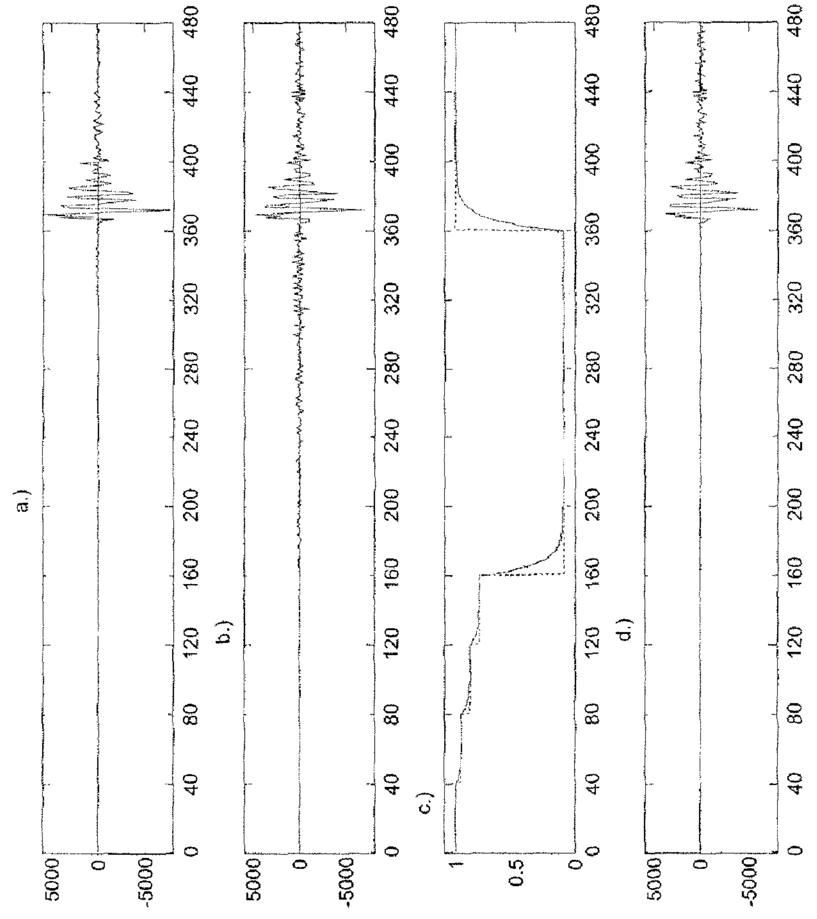
FIG. 8*a* illustrates an exemplary digital audio signal for which the invention according to an embodiment is implemented.
Figure 8B:
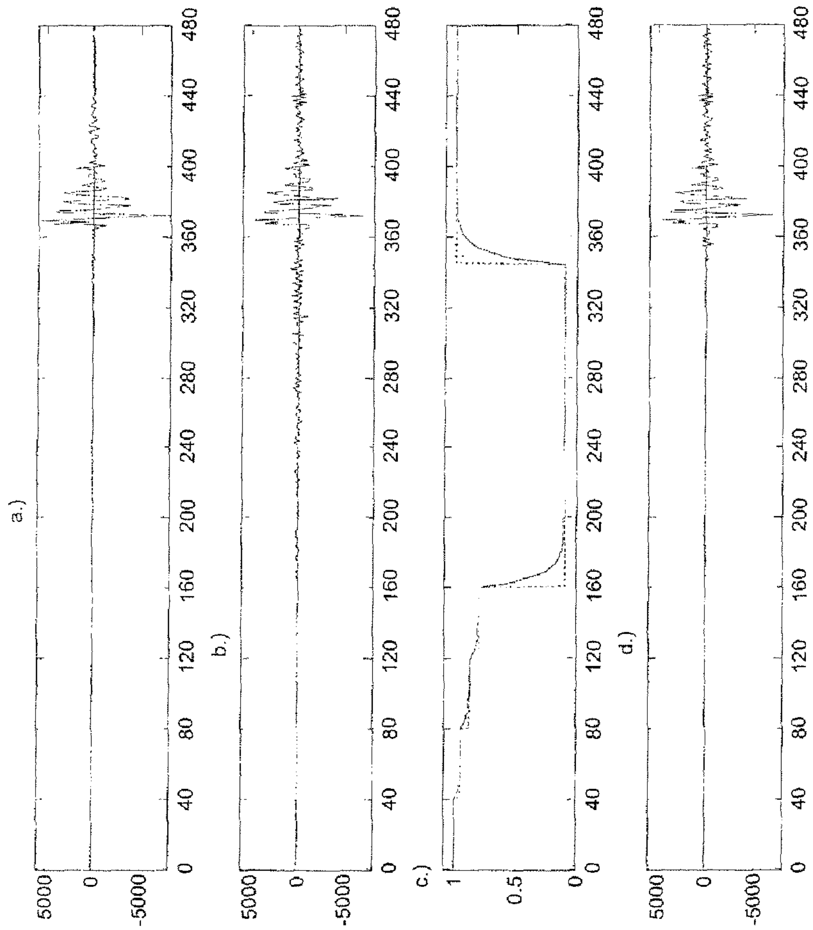
FIG. 8*b* illustrates the same digital audio signal for which the invention according to a variant embodiment is implemented.

FIGS. 8*a* and 8*b* illustrate the implementation of the attenuation method of the invention on a typical example.

In this example the signal is sampled at 8 kHz, the length of the frame is 160 samples and each frame is divided into 4 sub-blocks of 40 samples.

In part a.) of FIG. 8*a*, 3 frames of the original signal corresponding to the narrow-band part (0-4000 Hz) of the left channel of a stereo signal sampled at 16 kHz are represented. An attack or transition in the signal is situated in the sub-block beginning at the index 360. This signal has been coded for example by a stereo extension of the G.729.1 coder.

In part b.) of FIG. 8*a*, the result of the decoding (the left channel only) without pre-echo processing is illustrated. It is possible to observe the pre-echo onwards of sample 160 (start of the frame preceding the frame with the attack).

Part c.) shows the evolution of the pre-echo attenuation factor (continuous line) obtained by implementing the method according to the invention. The dashed line represents the factor before smoothing.

Part d.) illustrates the result of the decoding after application of the pre-echo processing (multiplication of signal b.) with signal c.)). It is seen that the pre-echo has indeed been removed.

FIG. 8*b* illustrates the same typical example for which an implementation of a variant embodiment of the attenuation method according to the invention is performed.

If FIG. 8*a* is observed closely, it is appreciated that the smoothed factor does not rise back to 1 at the moment of the attack, thus implying a decrease in the amplitude of the attack. The perceptible impact of this decrease is very low but can nonetheless be avoided.

For this purpose, it is for example possible to assign, before smoothing, the factor value 1 to the last few samples of the sub-block preceding the sub-block where the attack is situated. Part c.) of FIG. 8*b* gives an example of such a correction. In this example the factor value 1 has been assigned to the last 16 samples of the sub-block preceding the sub-block with the attack, based on the index 344.

Thus the smoothing function progressively increases the factor so as to have a value of close to 1 at the moment of the attack. The amplitude of the attack is then maintained.

The difficulty with this scheme is to know, in the frame which precedes the frame comprising the attack, whether or not the attack is situated in the first sub-block.

If the attack is situated in the first sub-block, then the factor value 1 must be assigned to the last samples of the frame. The problem is that on the concatenated signal it is not possible to determine with certainty the position of the attack, because of the symmetry of this part of the concatenated signal which in fact reflects the well-known property of "temporal aliasing" of the MDCT transform.

Figure 9:
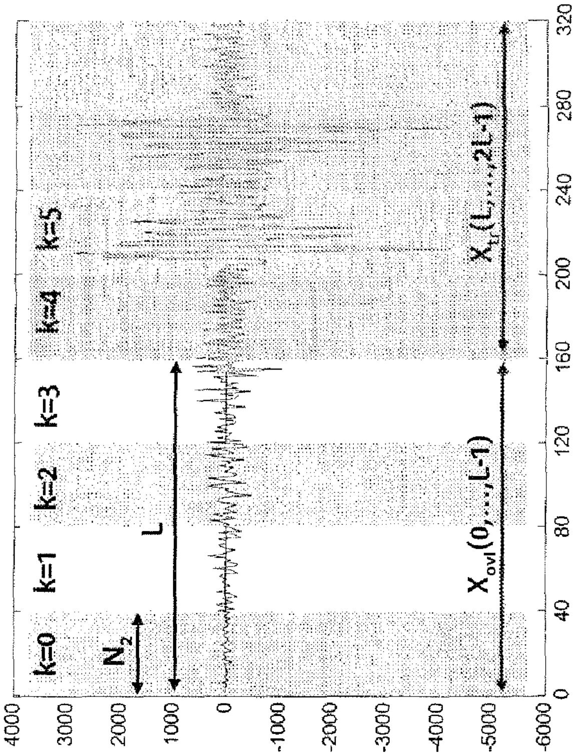
FIG. 9 illustrates the concatenated signal when the attack is situated in the second sub-block of the second part of the current frame.
Figure 10:
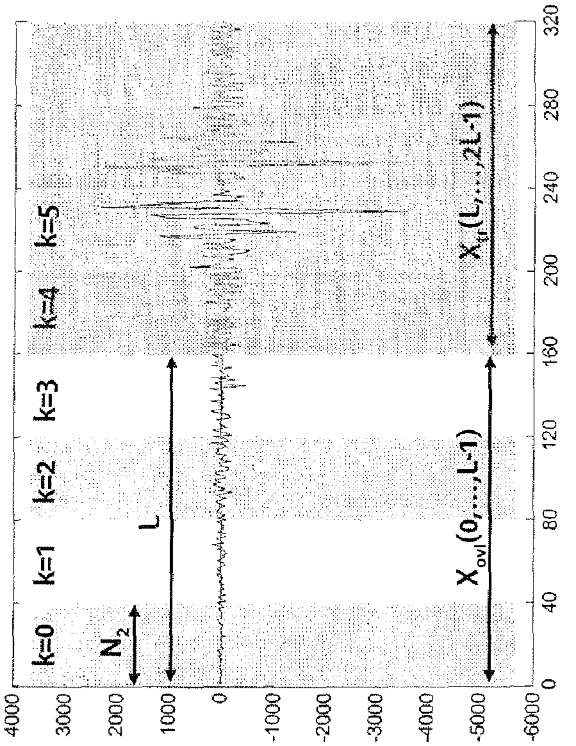
FIG. 10 illustrates the concatenated signal when the attack is situated in the third sub-block of the second part of the current frame.

FIGS. 9 and 10 illustrate the concatenated signal corresponding to the second frame of FIGS. 8*a* and 8*b*.

It is indeed possible to see that the attack is in the sub-block k=5 of the concatenated signal. This attack will therefore be either in the second or in the third sub-block of the reconstructed signal of the following frame. It will therefore not be in the first sub-block of the following frame. It is then not necessary to assign the factor value 1 to the last samples of the current frame. This is valid whether the signal actually has the attack in the second sub-block of the following frame (case of FIG. 9) or in the third sub-block (case of FIG. 10).

Figure 11:
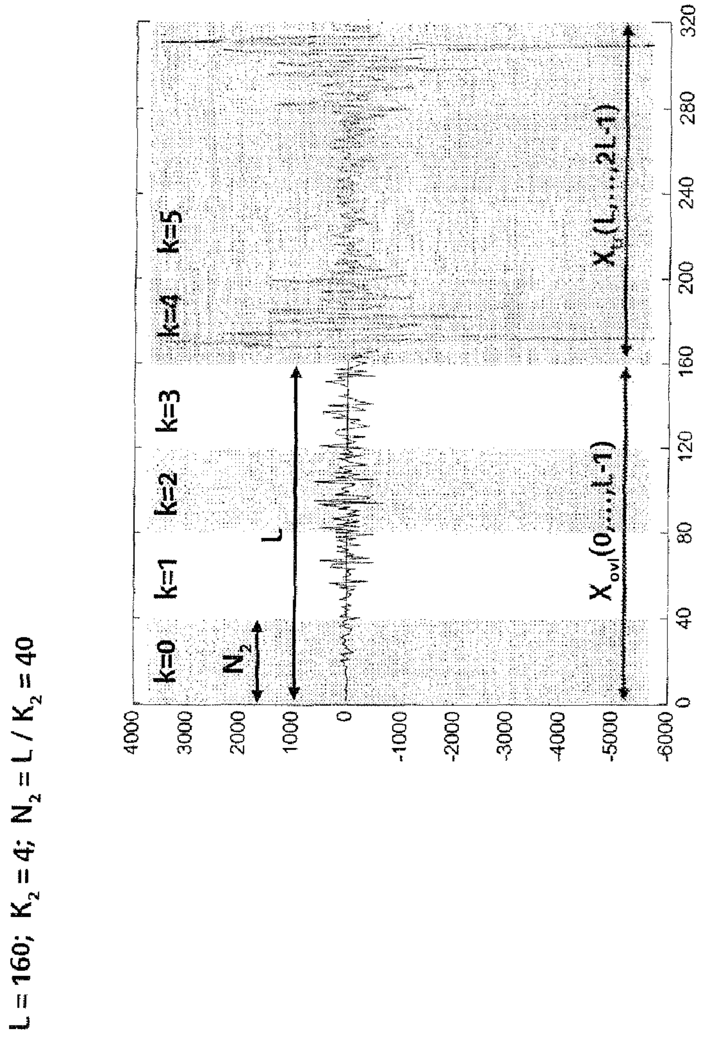
FIG. 11 illustrates the concatenated signal when the attack is situated in the first sub-block of the second part of the current frame.
Figure 12:
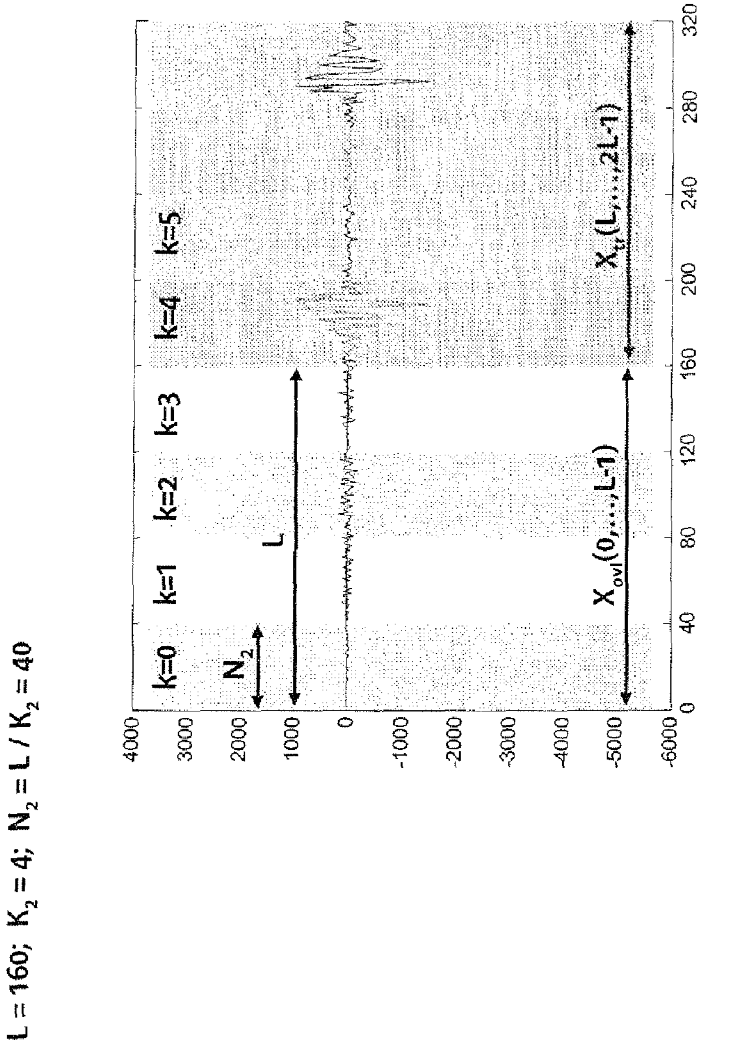
FIG. 12 illustrates the concatenated signal when the attack is situated in the fourth sub-block of the second part of the current frame.

On the other hand, as represented in FIG. 11 or 12, when the attack is in the $1^{st}$ or in the $4^{th}$ sub-block of the following frame, the attack is detected in the sub-block k=4 of the concatenated signal because of the symmetry of this part of the concatenated signal.

Now, if the attack is in the first sub-block, the factor value 1 must be assigned to the last samples of the frame but this is not necessary when the attack is in the $4^{th}$ sub-block.

One solution is to always assign the factor value 1 to the last samples of the frame if the attack is detected in the $4^{th}$ sub-block of the concatenated signal. If in the following frame, the attack is in the first sub-block (case of FIG. 11), operation is then optimal. On the other hand when the attack is in the $4^{th}$ sub-block (case of FIG. 12), the attenuation is sub-optimal since around the end of the frame, the pre-echo attenuation factor increases toward 1 for a few samples and then drops back to the correct attenuation level at the start of the following frame. The subjective impact of this sub-optimality is weak since when the attack lies in the $4^{th}$ sub-block of the following frame its amplitude is much decreased by the analysis windowing. The pre-echo caused by this attack is weak.

FIGS. 9 to 12 have been obtained with the same input signal, by shifting it by the length of a sub-block so as to move the position of the attack in the frame. By comparing FIGS. 11 and 12 for example, it is possible to observe the difference in pre-echo level as a function of the position of the attack: when the attack lies in the $4^{th}$ sub-block the pre-echo is markedly weaker.

The method which is the subject of the invention uses a particular example for calculating the start of the attack (search for the maximum of energy per sub-block) but can operate with any other scheme for determining the start of the attack.

The method which is the subject of the aforementioned invention is applied to the attenuation of the pre-echoes in any transform coder which uses an MDCT filter bank or any bank of filters with perfect reconstruction, real-valued or complex-valued, or banks of filters with almost perfect reconstruction as well as banks of filters using the Fourier transform or the wavelet transform.

It should be noted that in the case where a delay of a frame is tolerable at the decoder, the problems of locating a transient (attack) in the second part of the concatenated signal may be avoided. The method for reducing the pre-echoes is then applied directly to the reconstructed signal and no longer to the concatenated signal which is a hybrid between reconstructed signal/intermediate signal with temporal aliasing. The means for detecting transition, calculating attenuation factor and reducing pre-echoes described previously are applied.

Moreover, in the case where the concatenated signal is not explicitly defined, it is still possible to use the signal reconstructed at the current frame and an intermediate signal of the inverse MDCT to carry out the operations described previously.

Examples of applying the invention are given hereinafter.

An exemplary stereo signal coder is described with reference to FIG. 13*a*. A suitable decoder comprising an attenuation device according to the invention is described with reference to FIG. 13*b*.

Figure 13A:
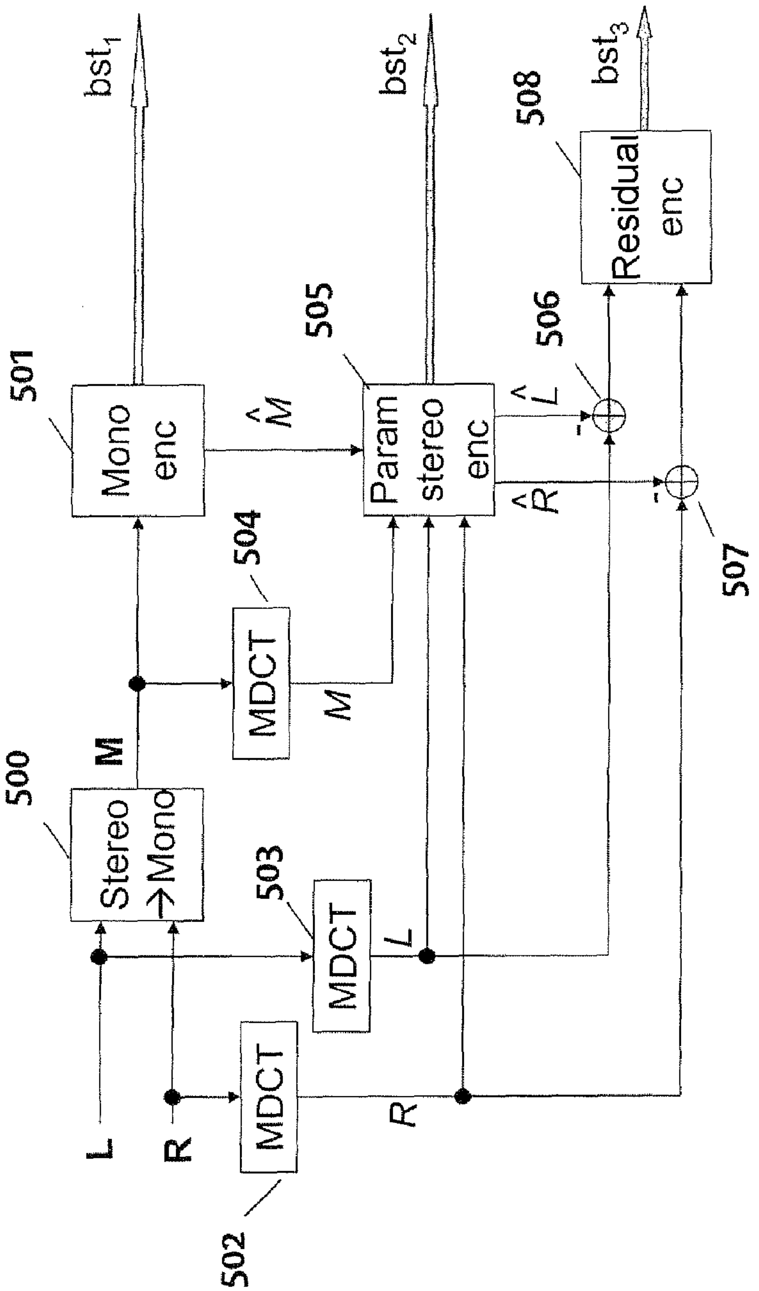
FIGS. 13*a* and 13*b* illustrate respectively a coder and a decoder of G.729.1 SWB/stereo type, the decoder comprising an attenuation device according to the invention.

FIG. 13*a* shows an exemplary coder, for which stereo information is transmitted per frequency band and is decoded in the frequency domain.

A mono signal M is calculated on the basis of the input signals of the left L and right R pathway by matrixing means 500.

The coder also integrates means of time-frequency transformation 502, 503 and 504 able to carry out a transform, for example a Discrete Fourier Transform or DFT, an MDCT transform ("Modified Discrete Cosine Transform"), an MCLT transform ("Modulated Complex Lapped Transform").

Values of left L and right R, and mono M frequency signals are thus obtained on the basis of the values L, R and M corresponding to the left and right, and mono temporal signals. To describe FIGS. 13 and 14, characters in italics will be used for signals in the frequency domain.

The mono signal M is also quantized and coded by the means 501 for example by the G.729.1 coder standardized to the UIT-T. This module delivers the core binary train $bst_1$ and also the decoded mono signal $\hat{M}$ transformed into the frequency domain.

The module 505 performs the stereo parametric coding on the basis of the frequency signals L, R, and M and of the decoded signal $\hat{M}$. It delivers the first optional extension layer for the binary train $bst_2$ and the two channels of the decoded stereo signal $\hat{L}$ and $\hat{R}$ obtained by decoding the two layers $bst_1$ and $bst_2$.

The stereo residual signal in the frequency domain is calculated by the means 506 and 507 and encoded by the coding means 508 and the second optional extension layer for the binary train $bst_3$ is obtained.

The encoded core signal $bst_1$ and the optional extension layers $bst_2$ and $bst_3$ are transmitted to the decoder.

Figure 13B:
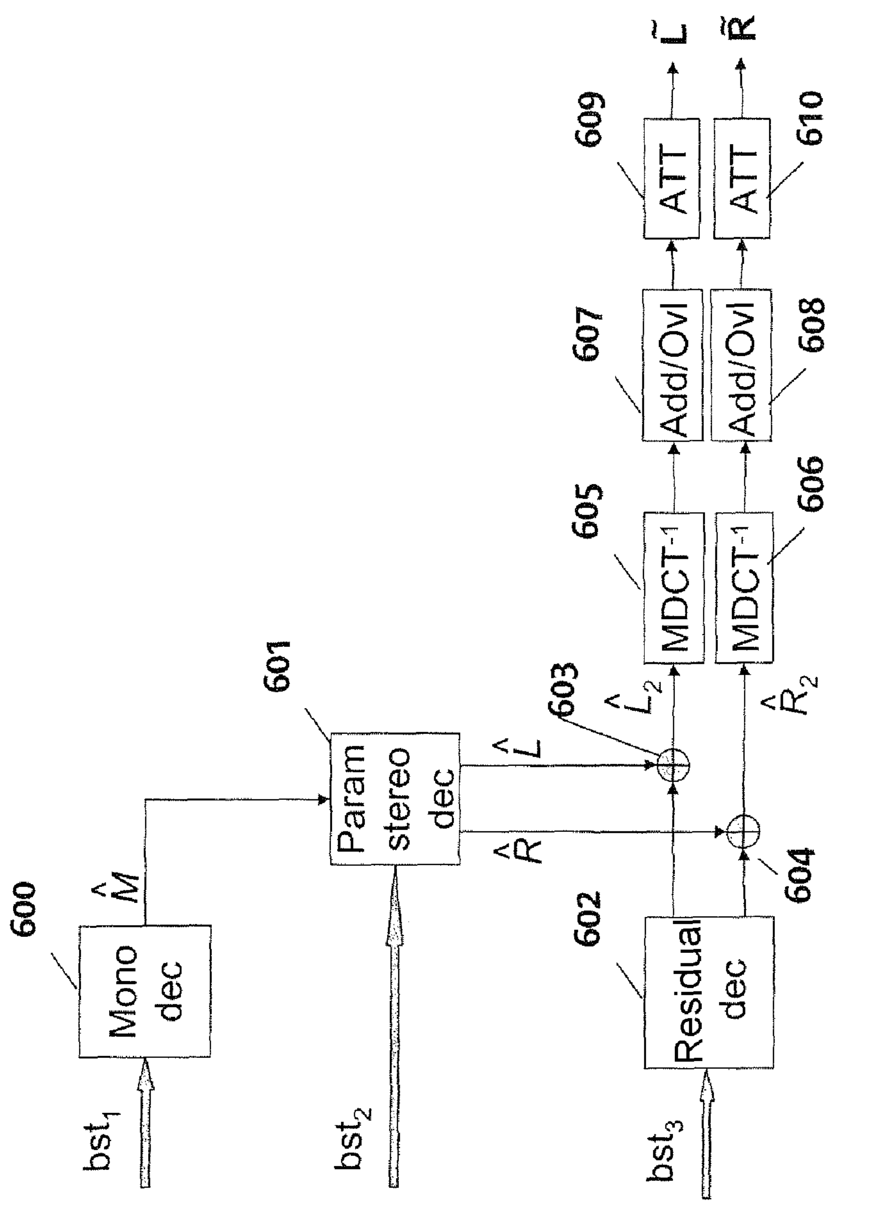

FIG. 13*b* shows an exemplary decoder able to receive the encoded core signal $bst_1$ and the optional extension layers $bst_2$ and $bst_3$.

Decoding means 600 make it possible to decode the core binary train $bst_1$ and to obtain the mono decoded signal $\hat{M}$. If the first optional extension layer $bst_2$ is available it may be decoded by the parametric stereo decoding means 601 so as to construct the decoded stereo signal $\hat{L}$ and $\hat{R}$ on the basis of the mono decoded signal $\hat{M}$. Otherwise, $\hat{L}$ and $\hat{R}$ will be equal to $\hat{M}$.

When the second optional extension layer $bst_3$ is also available it is decoded by the decoding means 602 so as to obtain the stereo residual signal in the frequency domain. This is added to the decoded stereo signal $\hat{L}$ and $\hat{R}$ so as to increase the accuracy of the frequency representation of the signal. Otherwise, when this second extension layer is not available $\hat{L}$ and $\hat{R}$ remain unchanged.

These two signals undergo a frequency-time inverse transformation by the modules 605 and 606, a reconstruction by add/overlap by the respective modules 607 and 608. A reduction of the pre-echoes according to the invention is then performed by the attenuation modules 609 and 610 such as described with reference to FIG. 3, so as to obtain the two channels of the decoded temporal stereo signal $\hat{L}$ and $\hat{R}$.

Another exemplary decoder comprising a device according to the invention is now described with reference to FIGS. 14*a* and 14*b*.

Figure 14A:
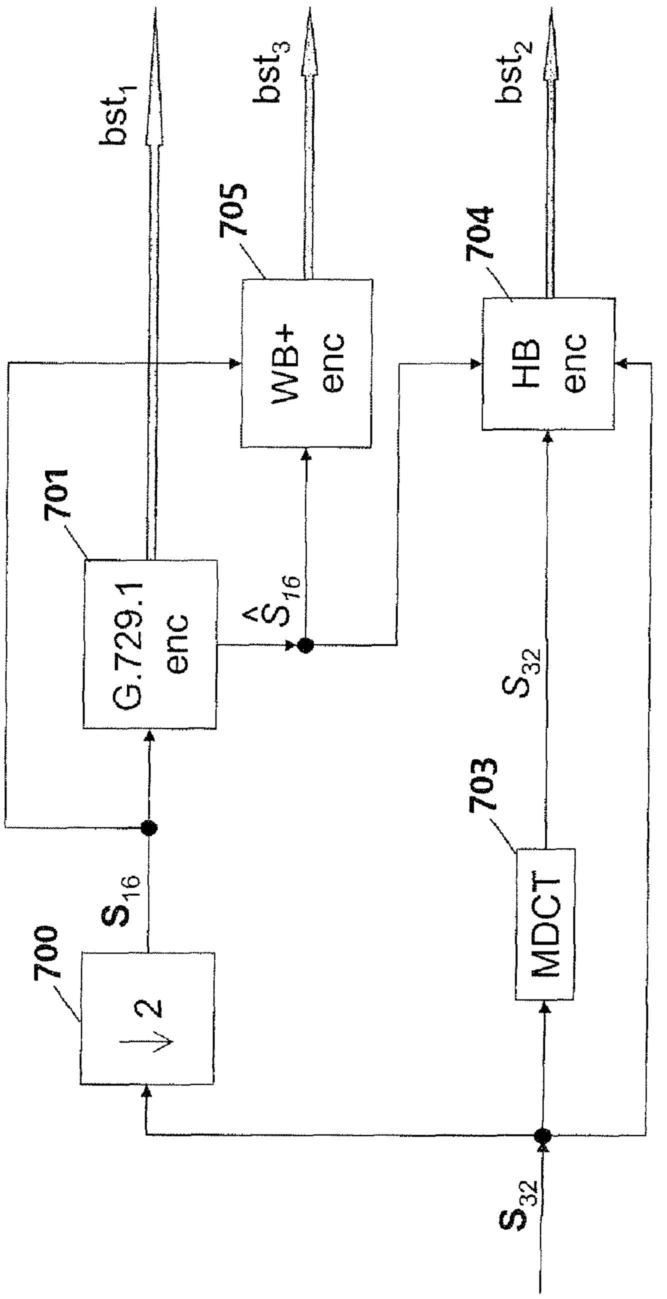
FIGS. 14*a* and 14*b* illustrate respectively a coder and a decoder of G.729.1 SWB type, the decoder comprising an attenuation device according to the invention.

FIG. 14*a* shows an exemplary coder of the super wide-band extension of a wide-band coder of G.729.1 type. The super wide-band input signal $S_{32}$ is sub-sampled by the sub-sampling means 700 to obtain a wide-band signal $S_{16}$. This signal is quantized and coded by the means 701 for example by the ITU G.729.1 coder. This module delivers the core binary train $bst_1$ and also the decoded wide-band signal $S_{16}$ in the frequency domain.

The super wide-band input signal $S_{32}$ is transformed into the frequency domain by the transformation means 704. The frequencies of the high band (band 7000-14000 Hz) that are not coded in the wide-band part will be encoded by the coding means 704. This coding is based on the spectrum of the decoded wide-band signal: $\hat{S}_{16}$. The coded parameters constitute the first optional extension of the binary train $bst_2$.

A second optional layer of the binary train $bst_3$ provided by the coding means 705, contains the parameters for improving the quality of the wide-band (50-7000 Hz).

Figure 14B:
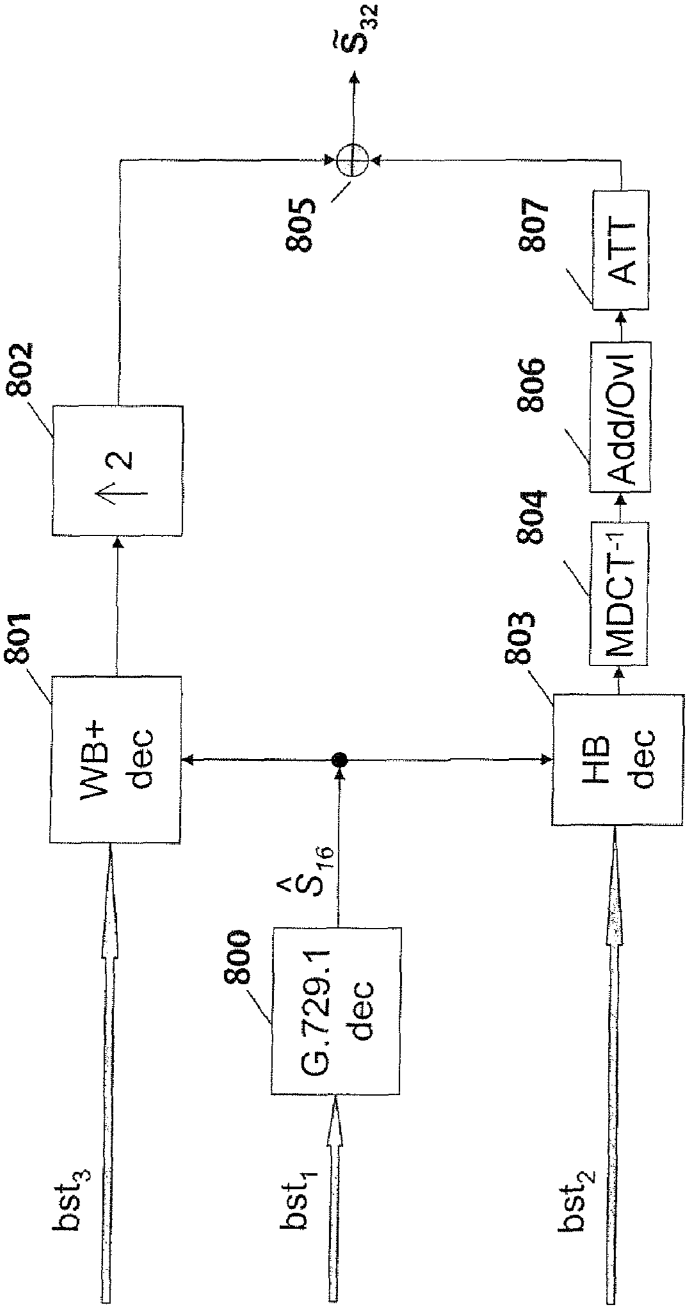

The decoder of FIG. 14*b* represents a super wide-band decoder (50-14000 Hz) corresponding to the encoder of FIG. 14*a*. The core binary train $bst_1$ is decoded by a wide-band coder of G.729.1 type (module 800). The spectrum of the wide-band decoded signal is therefore obtained. This spectrum is optionally improved by the decoding at 801 of the second optional extension layer $bst_3$. The module 801 also comprises the frequency-time transformation of the wide-band signal. The present invention does not intervene in this frequency-time transformation to reduce the pre-echoes since here the echo-less temporal signals (CELP and TDBWE components of the G.729.1 coder) are available and therefore the technique described in French patent application FR 06 01466 may be applied. The decoded wide-band signal is thereafter over-sampled by a factor of 2 in the means of over-sampling 802.

When the first optional extension layer $bst_2$ is available to the decoder, it is decoded by the decoding means 803.

This decoding is based on the spectrum of the decoded wide-band signal $\hat{S}_{16}$. The spectrum thus obtained contains the non-zero values solely in the frequency zone 7000-14000 Hz that is not coded by the wide-band part. In this configuration, between 7000 and 14000 Hz, no reference signals without pre-echo are therefore available. The attenuation device according to the invention is therefore implemented.

The temporal signal is obtained by frequency-time inverse transformation by the module 504. The add/overlap reconstruction module provides a reconstructed signal. The reduction of the pre-echoes according to the present invention is performed by the attenuation module 807 such as described with reference to FIG. 3.

Note that for this application, the signal after MDCT inverse transformation contains only frequencies above 7000 Hz. The temporal envelope of this signal can therefore be determined with very high accuracy, thereby increasing the effectiveness of the attenuation of the pre-echoes by the attenuation method of the invention.

Figure 15:
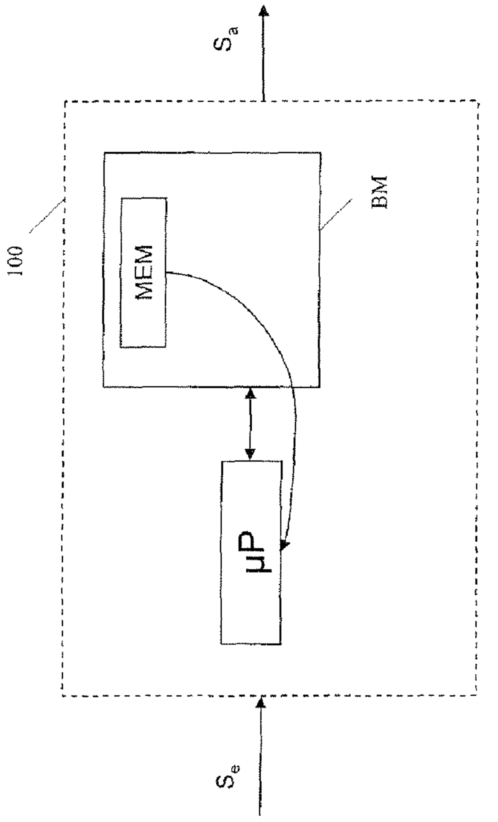
FIG. 15 illustrates an example of an attenuation device according to the invention.

An exemplary embodiment of an attenuation device according to the invention is now described with reference to FIG. 15.

In terms of hardware, this device 100 within the meaning of the invention typically comprises, a processor µP cooperating with a memory block BM including a storage and/or work memory, as well as a buffer memory MEM mentioned above in the guise of means for storing for example the temporal envelope of the current frame, the attenuation factor calculated for the last sample of the current frame, the energy of the sub-blocks of the current frame or any other data required for the implementation of the attenuation method such as described with reference to FIGS. 5 to 7. This device receives as input successive frames of the digital signal Se and delivers the signal Sa reconstructed with attenuation of pre-echoes if appropriate.

The memory block BM can comprise a computer program comprising the code instructions for the implementation of the steps of the method according to the invention when these instructions are executed by a processor μP of the device and especially a step of defining a concatenated signal, on the basis at least of the reconstructed signal of the current frame, a step of dividing said concatenated signal into sub-blocks of samples of determined length, a step of calculating a temporal envelope of the concatenated signal, a step of detecting a transition of the temporal envelope to a high-energy zone, a step of determining the sub-blocks of low energy preceding a sub-block in which a transition has been detected and a step of attenuation in the determined sub-blocks.

The attenuation is performed according to an attenuation factor calculated for each of the determined sub-blocks, as a function of the temporal envelope of the concatenated signal.

FIGS. 5 to 7 can illustrate the algorithm of such a computer program.

This attenuation device according to the invention may be independent or integrated into a digital signal decoder.

The invention claimed is:

1. A method for attenuating pre-echoes in a digital audio signal produced based on a transform coding, in the case where a reference signal arising from a temporal decoding and specific auxiliary information transmitted from a coder are not available, in which, upon decoding, for a current frame of this digital audio signal, the method comprising:
- defining a concatenated signal, based on at least a reconstructed signal of the current frame;
- dividing said concatenated signal into sub-blocks of samples of determined length;
- calculating a temporal envelope of the concatenated signal;
- detecting a transition of the temporal envelope to a high-energy zone;
- determining the sub-blocks of low energy preceding a sub-block in which a transition has been detected; and
- attenuating the determined sub-blocks, wherein the attenuation is performed utilizing an attenuation factor calculated for each of the determined sub-blocks, as a function of the temporal envelope of the concatenated signal and of the temporal envelope of the reconstructed signal of the previous frame; and
- calculating and storing the temporal envelope of the current frame after the step of attenuation in the determined sub-blocks.

2. The method as claimed in claim 1, wherein a minimum value is fixed for an attenuation value of the factor as a function of the temporal envelope of the reconstructed signal of the previous frame.

3. The method as claimed in claim 1, wherein the attenuation factor is determined as a function of the temporal envelope of said sub-block, of a maximum of the temporal envelope of the sub-block comprising said transition and of the temporal envelope of the reconstructed signal of the previous frame.

4. The method as claimed in claim 1, wherein the temporal envelope is determined by a sub-block energy calculation.

5. The method as claimed in claim 1, wherein an attenuation factor of value 1 is allocated to the samples of said sub-block comprising the transition as well as to the samples of the following sub-blocks in the current frame.

6. The method as claimed in claim 4, wherein the attenuation factor is determined per sub-block determined by:
- calculating a ratio of the maximum energy determined in the sub-block comprising a transition over the energy of the current sub-block;
- comparing the ratio with a first threshold;
- in a case where the ratio is less than or equal to the first threshold, allocating a value inhibiting the attenuation to the attenuation factor;
- in a case where the ratio is greater than the first threshold:
- comparing the ratio with a second threshold;
- in a case where the ratio is less than or equal to the second threshold, allocating a low attenuation value to the attenuation factor;
- in a case where the ratio is greater than the second threshold, allocating a high attenuation value to the attenuation factor.

7. The method as claimed in claim 1 wherein a smoothing function is determined between the factors calculated sample by sample.

8. The method as claimed in claim 1, wherein a factor correction is performed for the sub-block preceding the sub-block comprising a transition, by applying an attenuation value inhibiting the attenuation, to the attenuation factor applied to a predetermined number of samples of the sub-block preceding the sub-block comprising a transition.

9. A device for attenuating pre-echoes in a digital audio signal produced based on a transform coder, in the case where a reference signal arising from a temporal decoding and specific auxiliary information transmitted from a coder are not available, wherein, the device associated with a decoder comprises, for processing a current frame of this digital audio signal, modules for:
- defining a concatenated signal, based on at least a reconstructed signal of the current frame;
- dividing said concatenated signal into sub-blocks of samples of determined length;
- calculating a temporal envelope of the concatenated signal;
- detecting a transition of the temporal envelope to a high-energy zone;
- determining the sub-blocks of low energy preceding a sub-block in which a transition has been detected; and
- attenuating the determined sub-blocks, wherein the attenuation module performs the attenuation utilizing an attenuation factor calculated for each of the determined sub-blocks, as a function of the temporal envelope of the concatenated signal and of the temporal envelope of the reconstructed signal of the previous frame; and
- calculating and storing the temporal envelope of the current frame after the step of attenuation in the determined sub-blocks.

10. A decoder of a digital audio signal comprising the device as claimed in claim 9.

11. A non-transitory computer program product comprising code instructions for the implementation of the steps of the method as claimed in claim 1, when these instructions are executed by a processor.

* * * * *